(12) United States Patent
Kardel et al.

(10) Patent No.: US 11,679,735 B2
(45) Date of Patent: Jun. 20, 2023

(54) DEFLECTOR WITH SPRING ELEMENT

(71) Applicant: Autoliv Development AB, Vargarda (SE)

(72) Inventors: Arno Kardel, Glückstadt (DE); Felix Manneck, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 45 days.

(21) Appl. No.: 17/444,243

(22) Filed: Aug. 2, 2021

(65) Prior Publication Data

US 2022/0041128 A1 Feb. 10, 2022

(30) Foreign Application Priority Data

Aug. 6, 2020 (DE) .......................... 102020120780.8

(51) Int. Cl.
*B60R 22/18* (2006.01)

(52) U.S. Cl.
CPC ...... *B60R 22/18* (2013.01); *B60R 2022/1818* (2013.01)

(58) Field of Classification Search
CPC .... B60R 2022/1818; B60R 2022/1812; B60R 22/18
See application file for complete search history.

(56) References Cited

U.S. PATENT DOCUMENTS 6,702,327 B2 3/2004 Janz
2016/0214566 A1* 7/2016 Okuhira ................. B60R 22/24

FOREIGN PATENT DOCUMENTS

DE 102004050154 B3 2/2006
DE 102008025093 A1 12/2009

* cited by examiner

*Primary Examiner* — Milton Nelson, Jr.
(74) *Attorney, Agent, or Firm* — Dickinson Wright PLLC

(57) ABSTRACT

The present invention relates to a deflector for guiding a belt strap in a vehicle, at least comprising a metal body having a fastening opening attachable to the vehicle and having a belt slot, and an adapter made of plastic and connected to the metal body, wherein the metal body comprises a receptacle and an engagement section corresponding to the receptacle is formed on the adapter so that the engagement section engages in the receptacle, and wherein the receptacle has a receptacle inner surface facing the engagement section and the engagement section has an engagement surface facing the receptacle.

11 Claims, 6 Drawing Sheets

DEFLECTOR WITH SPRING ELEMENT

CROSS-REFERENCE TO RELATED APPLICATIONS

This application claims priority pursuant to 35 U.S.C. § 119(a) to German Patent Application No. 102020120780.8, filed Aug. 6, 2020, which application is incorporated herein by reference in its entirety.

FIELD

The present invention relates to a deflector for guiding a belt strap in a vehicle, at least comprising a metal body having a fastening opening attachable to the vehicle and having a belt slot, and an adapter made of plastic and connected to the metal body.

BACKGROUND

Usually, such deflectors are used in a vehicle for guiding a belt strap, which is held in the vehicle at least at three locations. The belt strap is laid around the body of a vehicle occupant so that the body is restrained held by the belt strap during braking of the vehicle or other movement relative to the vehicle. In this case, the belt strap is inter alia spanned by the deflector and held in a predetermined position so that the belt strap in an applied state restrains the body in a plurality of different regions.

A generic deflector is fastened to the vehicle and provides a belt guide slot for guiding the belt strap, which belt guide slot completely encloses or at least captively surrounds the belt strap. In this case, the belt strap is moved along the belt guide slot, for example when being applied by the vehicle occupant or during a braking process, so that friction of the belt strap occurs on the deflector, in particular in the region of the belt slot. In order to provide a sufficient restraining effect, the deflector must not fail within the scope of the forces to be expected. Usually used for this reason is a metal body that has at least one fastening opening for attaching to the vehicle and at the same time provides the belt slot. For weight reduction and for aesthetic reasons, the deflector frequently comprises an adapter made of plastic and connected to the metal body. For production-related reasons, higher tolerances are applied to the production of the metal body than to the adapter made of plastic. Consequently, the metal part is not always manufactured to fit precisely so that defects may occur during the assembly to form the deflector, and rattling noises may occur between the adapter and the metal body during operation of the deflector.

A deflector with the aforementioned features is known, for example, from DE 10 2004 050 154 B3. In this case, an engagement section of the adapter engages in the belt slot of the metal body so that a positive connection between the metal body and the adapter is established in this region. The deflector is fastened to the vehicle using a fastening opening. In order to prevent rattling noises arising from the deflector striking the vehicle, the adapter comprises at least one molded-on spring arm on the rear side facing the vehicle, which spring arm is supported against the vehicle so that vibrations generated during operation do not cause rattling noises.

However, a disadvantage of deflectors made in two parts of a metal body and the adapter is that rattling noises occur between the adapter and the metal body when the belt strap abutting against the belt guide slot slides or vibrations occur during operation of the vehicle. Rattling noises can occur in particular in regions in which a positive connection is formed, for example by an engagement section engaging in the metal body. Furthermore, during the manufacture of the adapter or of the metal body, engagement surfaces that do not precisely fit one another may be produced for production-related reasons. In this case, the metal body, which is in particular a metal stamped part, is frequently bent, rolled, or additionally stamped during further processing. During manufacture, the metal body usually has higher tolerance limits. For this reason, the adapter and the metal body often do not abut against one another as desired in the region in which the positive fit is to be formed, and rattling noises occur, in particular between the two components.

SUMMARY

The object of the present invention is to eliminate the disadvantages described with reference to the prior art and to provide an improved deflector for guiding a belt strap in a vehicle.

The object is achieved by a deflector having the features of the independent claim. Advantageous developments of the deflector are specified in the dependent claims and in the description, wherein individual features of the advantageous developments can be combined with one another in a technically sensible manner.

The object is achieved in particular by a deflector having the aforementioned features, wherein the engagement section comprises at least one spring element abutting against the receptacle inner surface.

For attaching in the vehicle, the deflector is fixed to the vehicle using a fastening means that can be inserted into the fastening opening of the metal body. In addition, a belt strap can be arranged in the belt slot so that the belt strap is held in the belt slot. In a preassembled state, the engagement section of the adapter engages in the receptacle of the metal body so that both parts are positively connected to one another and form the deflector. The receptacle of the metal body also has a receptacle inner surface that reproduces the contour of an engagement section of the adapter. An engagement surface of the engagement section is consequently arranged in the receptacle and can bear against the receptacle inner surface. The engagement surface preferably abuts at least partially, most preferably completely, against the receptacle inner surface. In this way, a positive connection between the metal body and the adapter is brought about. In this case, further connections can be formed between the metal body and the adapter, in particular also by fastening the deflector to the vehicle.

According to the invention, the engagement section comprises at least one spring element which abuts against the receptacle inner surface. In this case, the at least one spring element is preferably under tension and presses against the receptacle inner surface. Consequently, the at least one spring element exerts a pretensioning force from the adapter onto the metal body in the region of the receptacle. In this way, production-related surface flaws in the region of the receptacle inner surface can, for example, be compensated by the at least one spring element, wherein the at least one spring element abuts against the receptacle inner surface even if play exists between the metal body and the adapter. Consequently, the spring elements contribute to compensating production-related manufacturing tolerances on the metal body.

In addition, uncontrolled movement between the metal body and the adapter can be prevented by abutting the at least one spring element against the receptacle inner surface.

Striking, in particular, of the receptacle inner surface and the engagement surface is thus prevented by the at least one spring element. Furthermore, the at least one spring element can advantageously prevent defects in the region of the receptacle during the assembly to form the deflector. If a relative movement between the two components of the deflector occurs in the region of the receptacle due to vibrations during driving operation or due to sliding of the belt strap in the belt slot, a rattling noise is additionally prevented or an excited vibration is additionally damped by the at least one abutting spring element. A rattling noise can also be prevented by the at least one spring element in other regions of contact between the metal body and the adapter.

The deflector is in particular a two-piece component formed from the metal body and the adapter. The metal body is preferably a metal stamped part. Such a metal stamped part can advantageously be produced cost-effectively and can advantageously absorb, without signs of failure, the majority of the forces acting in the load case.

The adapter is preferably a one-piece plastic part. In addition, the adapter has an engagement section, in particular designed as a protrusion, so that the engagement section engages in a receptacle formed on the metal body. The adapter is preferably designed to correspond to the metal stamped part in further regions. In addition, further connections, for example clip hooks, are provided for fastening the adapter to the metal stamped part so that the deflector forms a preassembled separate component.

In this case, the adapter can in particular comprise a lower and an upper section, wherein a belt guide section can be formed on the upper section in the region of the belt slot of the metal body so that the belt strap is guided by the adapter. In particular, the adapter can reproduce one or the entire region of the belt slot. The lower section of the adapter is preferably connected to the upper section via two connecting arms so that the lower section and the upper section are connected and the adapter is formed as a one-piece plastic part. The lower section of the adapter in particular comprises the engagement protrusion.

Furthermore, the adapter may have further covering contours so that the metal body is not visible in the mounted state of the deflector in the vehicle. In the mounted state of the deflector in the vehicle, the upper section is preferably at least partially inserted into the fastening opening of the metal body, wherein the fastening means with which the deflector can be attached to the vehicle can preferably be guided through the adapter and can abut against the adapter.

The at least one spring element abutting against the receptacle inner surface can be, for example, a resilient section of the engagement section which protrudes or projects from the engagement section or the engagement surface, in particular in the unmounted state of the deflector. The spring element is preferably made of the same material as the adapter. Particularly preferably, the at least one spring element is also made of plastic and has a certain flexibility. Furthermore, the at least one spring element can be molded on, attached to, or placed on the engagement section so that it presses against the adapter in the preassembled state of the deflector. In this way, the at least one spring element can prevent rattling noises in the deflector, compensate production-related flaws, and avoid defects during assembly to form the deflector, in particular as a result of connecting the metal body to the adapter.

In one embodiment, the at least one spring element provides a spring force acting against the receptacle inner surfaces. The spring force is in particular a function of the material properties of the adapter and of the deflection of the at least one spring element. In the state abutting against the receptacle inner surface, the at least one spring element is preferably located in the elastic region. As a function of the spring force, a desired pretensioning may advantageously be set so that rattling noises can be prevented particularly well. The spring force preferably increases when the at least one spring element deflects away from the receptacle inner surface, so that uncontrolled striking of the receptacle inner surface against the engagement surface can be prevented. If excitation of the deflector causes the metal body and the adapter to move apart in the region of the receptacle, a deflection of the at least one spring element in the direction of the receptacle inner surface can advantageously prevent uncontrolled elimination of the pretensioning force.

Another advantageous embodiment of the invention provides that the at least one spring element is formed in one piece with the adapter. The at least one spring element can be formed, for example, by a projecting section on the adapter itself. In this case, the at least one spring element is flexible and projects from the adapter in the unmounted state of the deflector. Additional assembly or production steps can advantageously be dispensed with in the production of the adapter or the assembly of the deflector. Furthermore, the position of the at least one spring element on the engagement section can advantageously be predetermined.

A further advantageous embodiment of the invention provides that the adapter comprises at least two spring elements offset along the belt slot, so that the adapter can be provided with a spring force on the receptacle inner surface at least at two offset locations. The in particular elongated belt slot shaped to fit the belt strap is oriented in parallel to the preferably likewise elongated receptacle of the adapter. By means of an adapter that comprises at least two spring elements, a unilateral load or relative movement between the adapter and the metal body can advantageously be prevented. In addition, a rattling noise can be better prevented in the region of the receptacle, localized production flaws can be compensated by the at least two spring elements, and higher tolerance limits can be defined overall. The offset arrangement of the at least two spring elements makes it possible to prevent the rattling noises and to advantageously compensate the production flaws uniformly and in various regions of the receptacle of the metal body.

A further advantageous embodiment of the invention provides that the engagement surface has at least one opening and the at least one spring element is arranged at least partially in the opening. The engagement surface preferably has an opening for each spring element. The arrangement of the at least one spring element in the at least one opening advantageously makes it possible that when abutting against the receptacle inner surface of the engagement surface, the at least one spring element does not project, but a region thereof abutting against the receptacle inner surface aligns with the engagement surface in the region of the opening. In this way, it is advantageously possible for the receptacle inner surface to abut against the engagement surface, wherein at the same time a spring force acting on the receptacle inner surface is provided by the at least one spring element.

A further advantageous embodiment of the invention provides that the at least one spring element can be deflected in the direction of the receptacle inner surface and can be turned in the direction of the at least one opening. The at least one spring element abutting against the receptacle inner surface can advantageously be moved within the opening. In this way, the at least one spring element can particularly efficiently prevent rattling noises or compensate any unevenness of the receptacle inner surface as a consequence of production flaws. For example, in the case of two or more spring elements, each of which is arranged in an opening, contact of the receptacle inner surface and engagement surface can occur in different regions so that one of the spring elements is turned, and whereas another spring element is deflected in another region and projects from the engagement surface so that the engagement surface is not in contact with the receptacle inner surface. At least one deflectable and turnable spring element thus brings about a flexible and advantageous abutment of the at least one spring element against the receptacle inner surface of the metal body.

Another advantageous embodiment provides that a surface of the metal body facing away from the receptacle inner surface forms a belt contact surface delimiting the belt slot. In this way, the belt strap can be guided by the particularly stable metal body. Furthermore, guidance can advantageously be prevented close to the origin of a rattling noise, in particular caused by the belt strap sliding on the belt slot, by the at least one spring element, which is arranged in particular on the opposite side of the belt contact surface. The vibrations excited by sliding can thus be damped particularly efficiently and effectively by the at least one spring element.

A further advantageous development provides that at least two engagement ribs are formed by the engagement surface, wherein the at least two engagement ribs reproduce a contour of the receptacle inner surface so that the at least two engagement ribs bear against the receptacle inner surface. The at least two engagement ribs are preferably arranged so as to be distributed, in particular regularly distributed, over the engagement surface. The at least two engagement ribs are preferably not arranged directly in the region of the at least one spring element but are offset along the belt slot. In this way, lateral displacement of the metal body relative to the adapter can advantageously be prevented, wherein the at least one spring element laterally hits one of the at least two projecting engagement ribs. In addition, the receptacle inner surface can advantageously abut against the at least two engagement ribs. The metal body abutting against the adapter in the region of the receptacle can advantageously be predetermined by the at least two engagement ribs. Furthermore, a maximum turning of the at least one spring element in the direction of the engagement section can be predetermined by the at least two engagement ribs since the receptacle inner surface in the region of the at least two engagement ribs comes to abut against the engagement ribs binding the engagement surface. For assembly purposes of the deflector, a turning of the at least one spring element via the projecting engagement ribs in the direction of the engagement section is possible. If the at least one spring element is arranged in an opening, it is likewise possible for assembly purposes that the at least one spring element is turned beyond the opening into an inner region of the opening. The at least two engagement ribs can thus advantageously predetermine the region of abutting of the metal body and the adapter in the region of the receptacle.

A further embodiment provides that the receptacle is formed by a rolling section extending in the direction of the belt slot. Since the metal body is preferably a metal stamped part, a receptacle can advantageously be formed by bending or rolling a region of the metal stamped part. The engagement section of the adapter is correspondingly designed to fit the rolling section extending in the direction of the belt slot. In this way, an anti-rotation device of the metal body relative to the adapter can advantageously be provided. Furthermore, a positive connection can advantageously be formed by a rolling section. In addition, the belt contact surface can advantageously be formed by a surface of the rolling section facing away from the receptacle inner surface.

A further advantageous embodiment of the invention provides that the maximum deflection of the at least one spring element is predetermined by the engagement surface and/or by the engagement ribs. In the mounted deflector, the receptacle inner surface preferably abuts at least partially against the engagement surface or one or more of the at least two engagement ribs forming the engagement surface. If a relative movement occurs between the engagement surface and the receptacle inner surface, the at least one spring element can continue as desired to bring about tension by abutting against the receptacle inner surface between the metal body and the adapter. A maximum deflection of the spring element in the direction of the engagement surface and thus the maximum acting spring force of the at least one spring element can advantageously be predetermined by the design of the engagement ribs or of the engagement surface.

BRIEF DESCRIPTION OF THE DRAWINGS

The invention and the technical environment are explained below by way of example with reference to the figures. The following are shown schematically.

DETAILED DESCRIPTION

Figure 1:
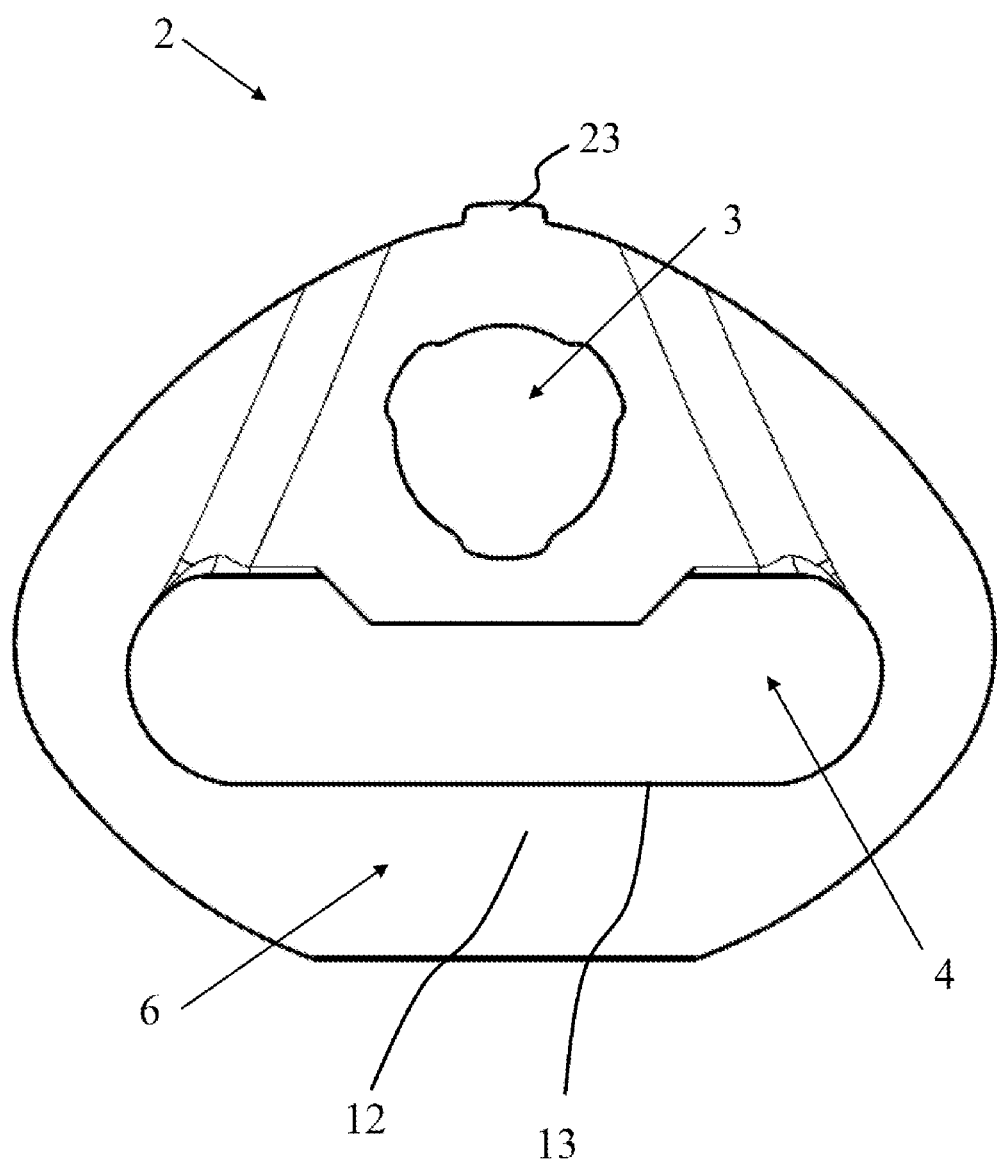
FIG. 1: a metal body of a deflector according to the invention.

The deflector 1 shown in the figures includes a metal body 2 having a fastening opening 3 and a belt slot 4 as well as an adapter 5 connected to the metal body 2. For this purpose, the metal body 2 designed as a metal stamped part has a receptacle 6 having a receptacle inner surface 8. The receptacle 6 is formed by a rolling section 15. An engagement section 7 of the adapter 5 has an engagement surface 9, wherein the engagement section 7 and the engagement surface 9 are designed to correspond to the receptacle 6 and the receptacle inner surface 8 so that the engagement section 7 can be arranged in the receptacle 6 and the adapter 5 can be connected to the metal body 2. Formed on the engagement surface 9 are two openings 11, in which two spring elements 10 formed in one piece with the adapter 5 are arranged. The spring elements 10 abut against the receptacle inner surface 8. On the side of the rolling section 15 facing away from the receptacle inner surface 8, a belt contact surface 13 is formed by the surface 12 of the metal body 2. Furthermore, the engagement surface 9 comprises five engagement ribs 14, which are likewise designed to correspond to the receptacle 6 so that the five engagement ribs 14 abut against the receptacle inner surface 8. The metal body 2 also has a clip protrusion 23 above the fastening opening 3.

The adapter 5 is formed by an upper section 18 and a lower section 19. The upper section 18 is recessed correspondingly to the fastening opening 3 of the metal body 2 so that a fastening means can correspondingly be guided through the adapter 5. In addition, the upper section 18 comprises a belt section 20 engaging in the belt slot 4 of the metal body 2. The upper section 18 of the adapter 5 is connected to the lower sections 19 via two connecting arms 17 arranged in each case laterally next to the fastening of the reproduced fastening opening 3. The lower section 19 comprises the engagement section 7 having the spring arms 10 and the engagement ribs 14. A covering contour 21 is additionally formed on the adapter 5 and extends laterally from the lower section 19. Furthermore, the adapter 5 comprises a clip hook 16 which engages behind the clip protrusion 23 of the metal body 2 in the assembled state of the deflector 1. Furthermore, the adapter 5 has three support elements 24 on the rear side and three further clip hooks 22 directed in the direction of the fastening opening 3.

The adapter 5 is fastened to the metal body 2 via the clip hook 16, which engages behind the clip protrusion 23 of the metal body 2 above the fastening opening 3. Furthermore, the three further clip hooks 22 of the adapter 5 engage behind the metal body 2 in the region of the fastening opening 3. The three further clip hooks 22 are thereby supported laterally from the inside against the fastening opening 3 of the metal body 2 and, offset over the circumference, engage behind the metal body 2. The further clip hooks 22 are arranged so as to be regularly distributed over the circumference of the fastening opening 3. The three support elements 24 of the adapter 5 arranged on the rear side are supported against a part of the vehicle and pretension the deflector 1 against the part of the vehicle in addition to a fastening means that can be inserted into the fastening opening 3. In this way, uncontrolled striking of the deflector 1 against the vehicle can be prevented. In this case, the three support elements 24 are arranged at an offset from the further clip hooks 22 and are distributed regularly over the circumference of the fastening opening 3, thereby bringing about an advantageously uniform connection or support of the deflector 2.

Figure 2:
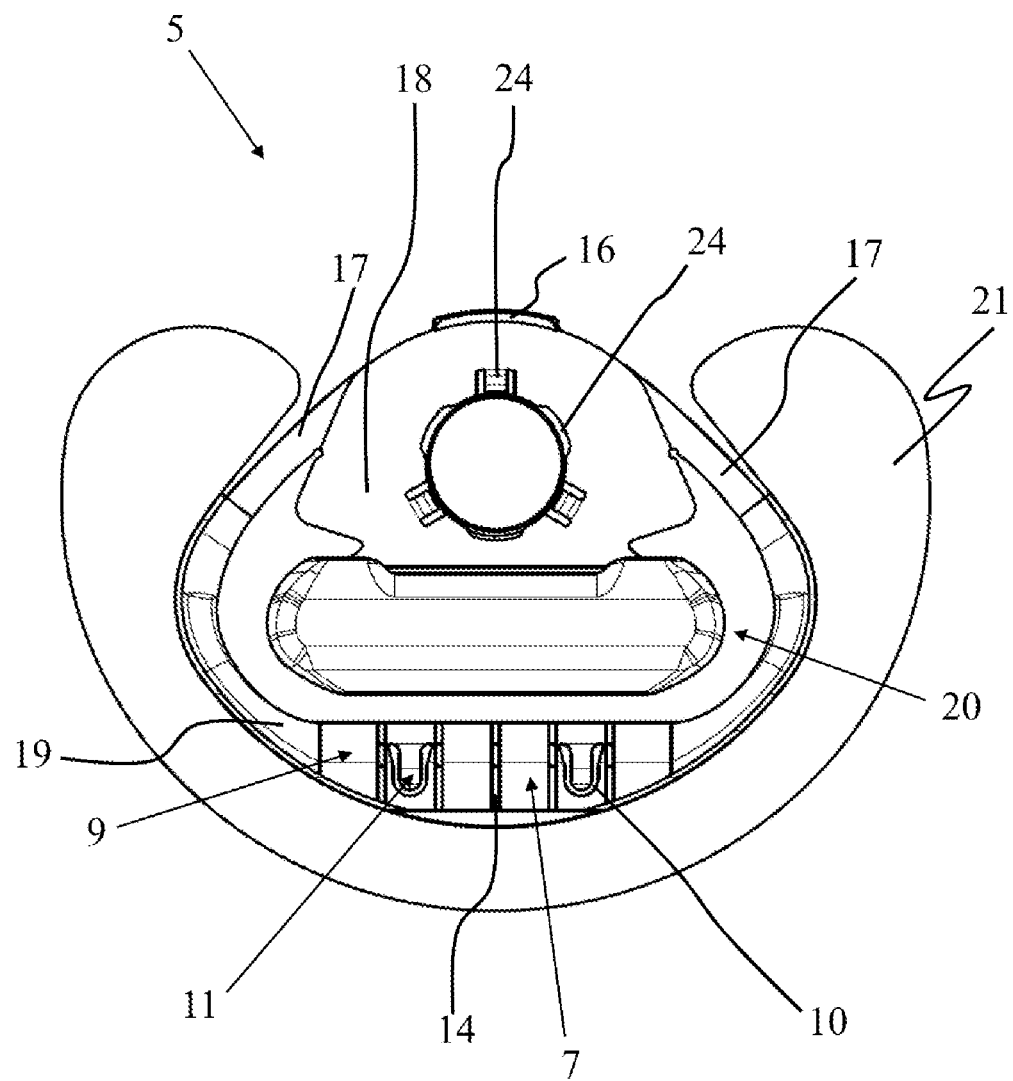
FIG. 2: an adapter of a deflector according to the invention.
Figure 3:
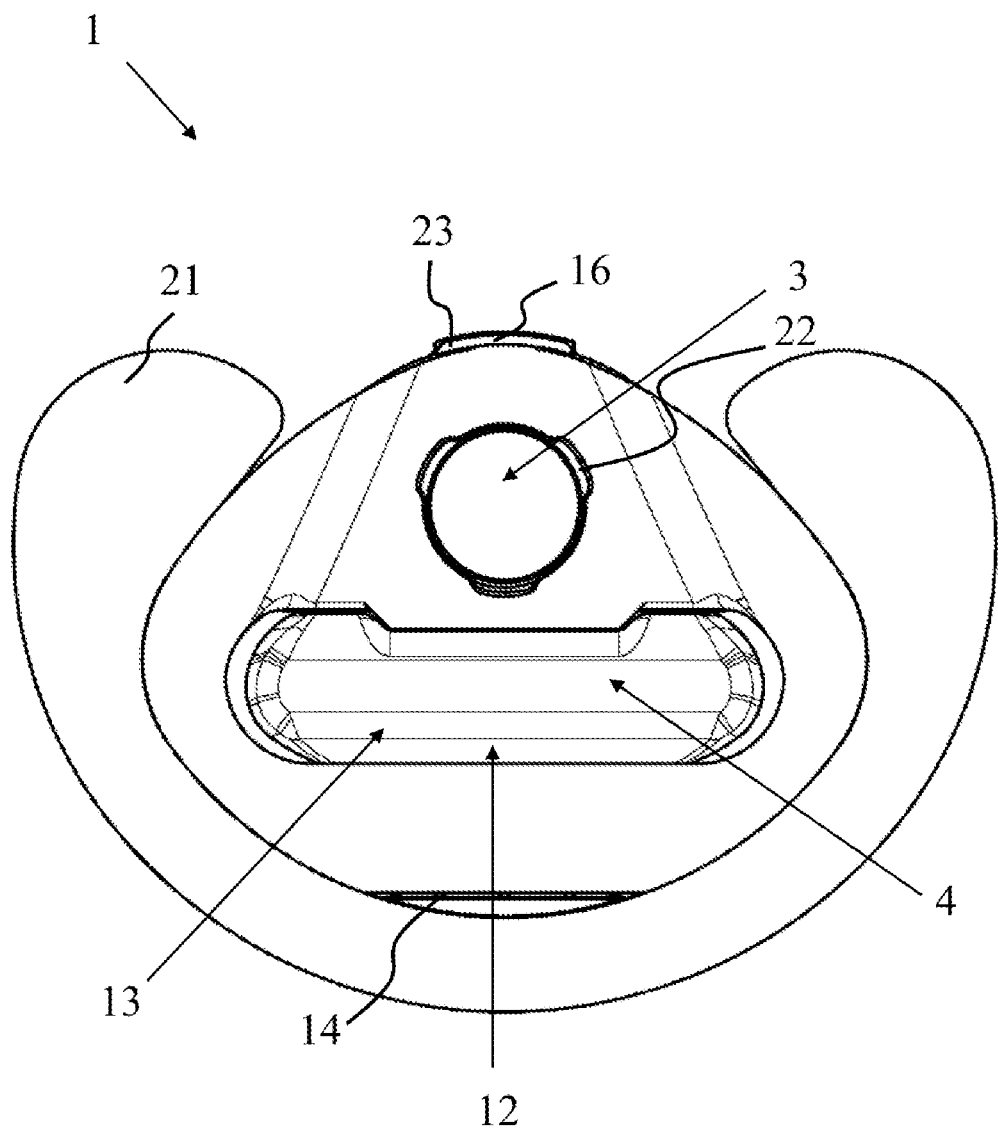
FIG. 3: a deflector according to the invention, which is assembled from the metal body according to FIG. 1 and the adapter according to FIG. 2, FIG. 4: a deflector according to the invention with a section.
Figure 4:
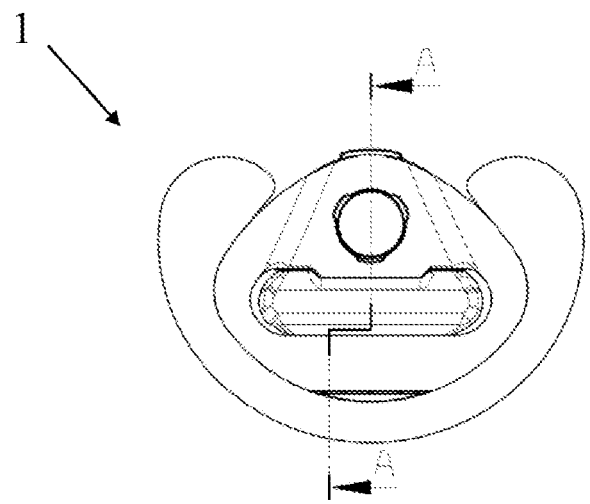
Figure 5:
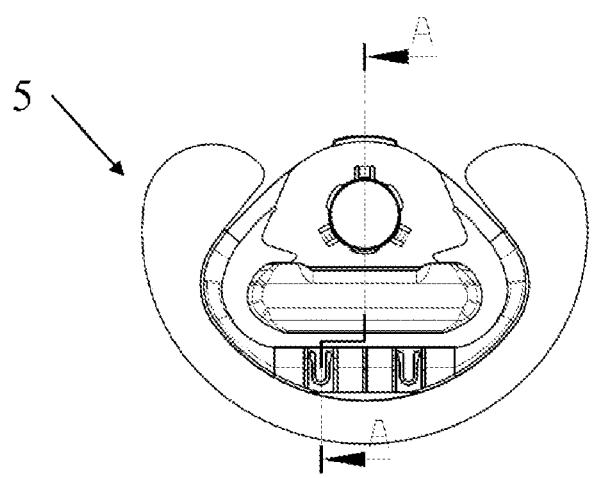
FIG. 5: an adapter with a section.
Figure 6:
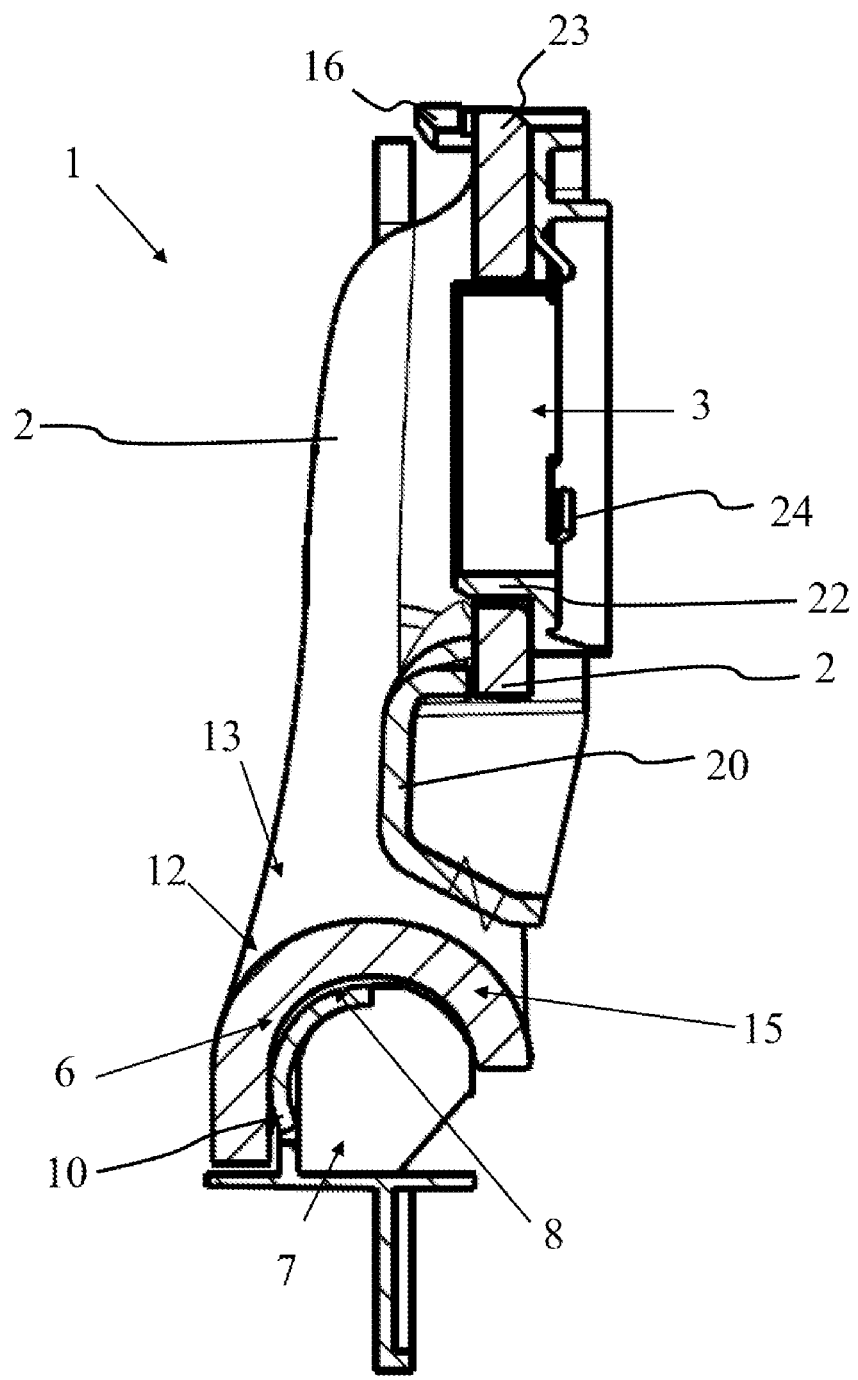
FIG. 6: a deflector according to the invention in a sectional view according to FIG. 4, and FIG. 7: an adapter in a sectional view according to FIG. 5.

Together with the adapter 5 shown in FIG. 2, the metal body 2 shown in FIG. 1 forms the deflector 1 shown in FIG. 3. The metal body 2 and the adapter 5 abut against one another in a plurality of regions, as can be seen in the sectional view according to FIG. 4 shown in FIG. 6. The adapter 5 engages with the belt section 20 in the belt slot 4. Furthermore, the adapter 5 engages in the metal body 2 in the region of the fastening opening 3, wherein the three further clip hooks 22 of the adapter 5 engage in the fastening opening 3 of the metal body 2. The additional connection via the clip hook 16 to the clip protrusion 23 additionally holds the adapter 5 and the metal body 2 together.

The connection of the metal body 2 and of the adapter 5 to the deflector 1 also takes place via the engagement section 7 engaging in the receptacle 6. In this case, the engagement surface 9 comprises the five projecting engagement ribs 14 so that the engagement ribs 14 abut against the receptacle inner surface 8 of the receptacle 6 of the metal body 2. The receptacle 6 is in this case formed by a rolling section 15 of the metal body. Advantageously, the metal body 2 designed as a metal stamped part can be bent or rolled during its production so that the receptacle 6 with the receptacle inner surface 8 is curved inward. Furthermore, a belt contact surface 13 is provided in the region of the belt slot 4 on the surface 12 of the metal body 2 opposite the receptacle inner surface. At the same time, the surface 12 or the belt contact surface 13 delimits the belt slot 4 in one direction. As can be seen in particular in FIG. 6, the adapter 5 likewise engages with the belt section 20 on the front side in the belt slot 4 of the metal body 2 in the region of the belt contact surface 13 so that the a belt strap can advantageously slide along the adapter 5 and abrasion on the sharp edges of the belt slot 4 can be avoided.

Figure 7:
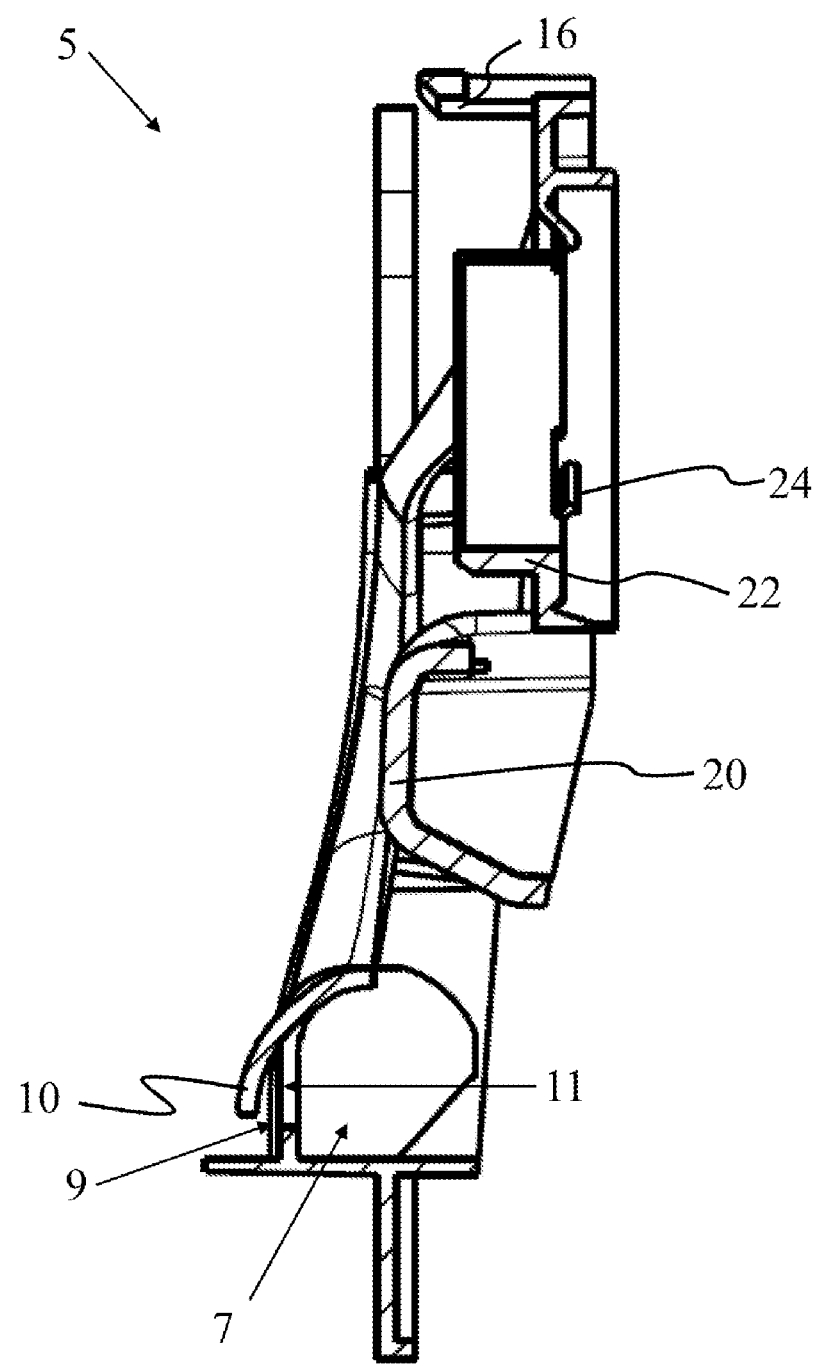

According to FIG. 7, the two spring elements projecting from the engagement surface 9 or from the engagement ribs 14 are each arranged in an opening 11. If the adapter 5 is connected to the metal body 2 to form the deflector 1, the spring elements 10 press against the receptacle inner surface 8 of the receptacle 6 and can advantageously compensate any unevenness or an offset of the rolling section 15 of the metal body 2 and prevent tilting during assembly. As can be seen in particular in FIG. 6, the spring elements 10 are in contact with the receptacle inner surface 8. The receptacle inner surface 8 also abuts against the five engagement ribs 14 reproducing the contour of the receptacle inner surface 8. As can be seen in particular in FIG. 6, the spring elements 10 align with the engagement ribs 14, which form the engagement surface 9 in sections. In this case, the spring elements 10 of the deflector 1 are turned maximally in the direction of the interior of the engagement section 7, wherein the spring elements 10 are arranged partially in the corresponding opening 11.

If the adapter 5 now strikes the metal body 2, rattling noises are prevented by the tensioning force of the spring elements 10. Furthermore, unilateral uncontrolled striking or moving apart of the metal body 2 and the adapter 5 can be prevented by the two spring elements 10 arranged at an offset. For example, if the receptacle inner surface 8 moves away from the engagement ribs 14 on the right-hand side in FIG. 2 as a result of the metal body 2 and the adapter 5 moving apart, the right-hand spring element 10 can correspondingly deflect and continue to abut against the receptacle inner surface 8 so that a tensioning force continues to be provided. The same applies if the receptacle 6 formed by the rolling section 15 has an irregularly shaped receptacle inner surface 8.

While the above description constitutes the preferred embodiment of the present invention, it will be appreciated that the invention is susceptible to modification, variation and change without departing from the proper scope and fair meaning of the accompanying claims.

The invention claimed is:

1. A deflector for guiding a belt strap in a vehicle, at least comprising:
   a metal body having a fastening opening attachable to the vehicle and having a belt slot, and
   an adapter made of plastic and connected to the metal body,
   wherein the metal body comprises a receptacle and an engagement section corresponding to the receptacle is formed on the adapter so that the engagement section engages in the receptacle,
   wherein the receptacle has a receptacle inner surface facing the engagement section and the engagement section has an engagement surface facing the receptacle, wherein the engagement section comprises at least one spring element abutting against the receptacle inner surface, and
   wherein the engagement surface has at least one opening and the at least one spring element is arranged at least partially in the opening.

2. The deflector according to claim 1, wherein the at least one spring element provides a spring force acting against the receptacle inner surface.

3. The deflector according to claim 1, wherein the at least one spring element is formed in one piece with the adapter.

4. The deflector according to claim 1, wherein the adapter comprises at least two spring elements offset along the belt slot, so that a spring force can be provided on the receptacle inner surface at least at two offset locations.

5. The deflector according to claim 1, wherein the maximum deflection of the at least one spring element is predetermined by the engagement surface and/or by engagement ribs.

6. The deflector according to claim 1, wherein the at least one spring element can be deflected in the direction of the receptacle inner surface and can be turned in the direction of the at least one opening.

7. The deflector according to claim 1, wherein a surface of the metal body facing away from the receptacle inner surface forms a belt contact surface delimiting the belt slot.

8. The deflector according to claim 1, wherein at least two engagement ribs are formed by the engagement surface, wherein the at least two engagement ribs reproduce a contour of the receptacle inner surface so that the at least two engagement ribs bear against the receptacle inner surface.

9. The deflector according to claim 1, wherein the receptacle is formed by a rolling section extending in the direction of the belt slot.

10. A deflector for guiding a belt strap in a vehicle, at least comprising:
  a metal body having a fastening opening attachable to the vehicle and having a belt slot, and
  an adapter made of plastic and connected to the metal body,
  wherein the metal body comprises a receptacle and an engagement section corresponding to the receptacle is formed on the adapter so that the engagement section engages in the receptacle,
  wherein the receptacle has a receptacle inner surface facing the engagement section and the engagement section has an engagement surface facing the receptacle, wherein the engagement section comprises at least one spring element abutting against the receptacle inner surface, and
  wherein the receptacle is formed by a rolling section extending in the direction of the belt slot.

11. A deflector for guiding a belt strap in a vehicle, at least comprising:
  a metal body having a fastening opening attachable to the vehicle and having a belt slot, and
  an adapter made of plastic and connected to the metal body,
  wherein the metal body comprises a receptacle and an engagement section corresponding to the receptacle is formed on the adapter so that the engagement section engages in the receptacle,
  wherein the receptacle has a receptacle inner surface facing the engagement section and the engagement section has an engagement surface facing the receptacle, wherein the engagement section comprises at least one spring element abutting against the receptacle inner surface, and
  wherein at least two engagement ribs are formed by the engagement surface, wherein the at least two engagement ribs reproduce a contour of the receptacle inner surface so that the at least two engagement ribs bear against the receptacle inner surface.

* * * * *